Jan. 4, 1966
T. B. BISSETT ETAL
3,227,882
IDENTIFICATION SYSTEM USING REPETITIVELY
MODULATED INFRARED ENERGY
Filed Jan. 5, 1962
2 Sheets-Sheet 1

INVENTORS:
Thomas B. Bissett
Leonard A. Mende
By Smyth, Roston & Pavitt
Attorneys INVENTORS:
Thomas B. Bissett
Leonard A. Mende
By Smyth, Roston & Pavitt
Attorneys United States Patent Office 3,227,882

Patented Jan. 4, 1966

3,227,882

IDENTIFICATION SYSTEM USING REPETITIVELY MODULATED INFRARED ENERGY

Thomas B. Bissett, Malibu, and Leonard A. Mende, Los Angeles, Calif., assignors to The Bissett-Berman Corporation, Santa Monica, Calif., a corporation of California Filed Jan. 5, 1962, Ser. No. 165,718
15 Claims. (Cl. 250—199)

This invention relates to an identification system for use between objects having relative motion. For example, the system can be used between a moving vehicle and a stationary object or between two moving vehicles.

As a specific example, the identification system can be used between an aircraft and a ground observer. Current methods of identifying low-flying aircraft are by looking for markings on the airplane or by identifying the basic silhouette of the airplane. Other means of identification are by the use of flight corridors or other maneuver tactics. These procedures are not practical since the range at which identification is desired is sufficiently large to make visual identification unlikely. The system can be used to determine if the aircraft is a friend or stranger as a means of identification between specific aircraft.

This invention provides an optical system by which a ground observer can readily identify low-flying aircraft. The invention includes a transmitter mounted on the aircraft and a receiver held by the ground observer. The transmitter includes a light source for producing visible light and an infrared band of energy. The light source is modulated to produce a coded output signal. The signal passes through a filter which allows only the infrared portion of the signal to be transmitted into the atmosphere.

The ground observer has a small receiver which includes a filter to pass only the coded infrared signal. The coded signal passes through a lens system which collects and focuses the signal on a cell responsive to infrared energy. The cell produces an electrical signal in accordance with the coded infrared signal radiated by the transmitter on the aircraft. The electrical signal is converted into audio information, which usually consists of a coded word, to identify the aircraft to the ground observer.

The system can use either infrared energy or visible light but the infrared band is preferable. This is because there is a possibility that during the night the visible light could act as a guide for a stranger to determine the location of the airplane. Infrared energy is not detectable by the naked eye and operates as effectively at night as during the day. It is, therefore, to be preferred as the means of communication.

One disadvantage in the use of infrared energy and also visible light is that these forms of energy are affected by atmospheric conditions (clouds, fog, etc.,). However, since the system of the present application finds its greatest utility in the identification of friendly aircraft by a ground observer, the system need only operate during visibility condtions when the ground observer can effect a manual sighting.

Other aspects of the invention will become apparent upon a detailed examination of the invention, a specific embodiment of which is shown in the drawings. In the drawings.

Figures 1, 2, 3:
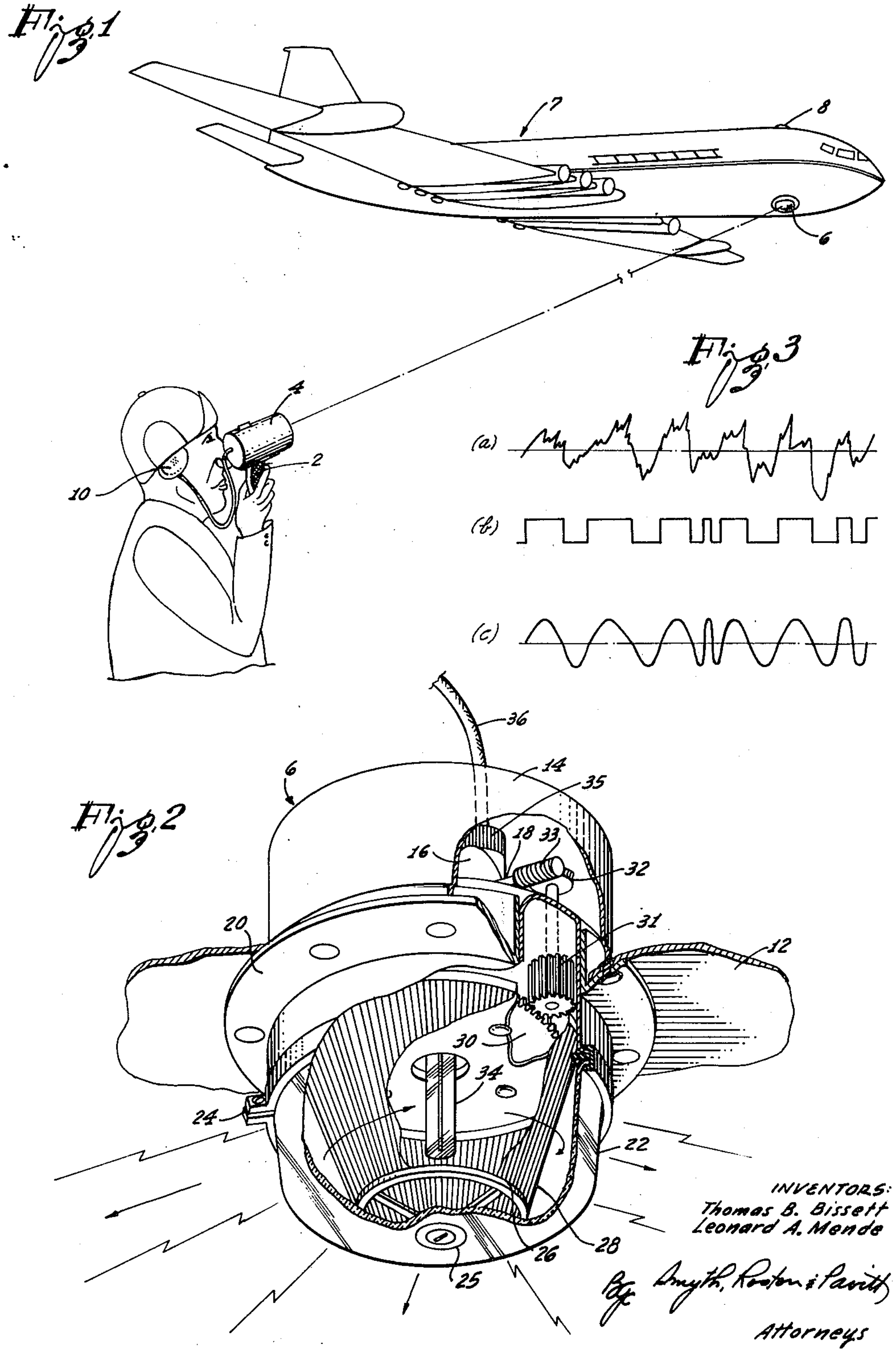
FIGURE 1 shows a general use of the invention where a ground observer uses a receiver to pick up a signal radiated by a transmitter located on an aircraft to determine the identity of the aircraft.
FIGURE 2 shows a detailed view of one embodiment of a transmitter located on the aircraft.
FIGURE 3 shows curves illustrating the derivation of the code signal.

In FIGURE 1, a ground observer grasps a handle 2 on which is mounted a receiver 4 designed in accordance with the concepts of this invention. The receiver picks up signals radiated by a transmitter 6 located on an aircraft generally indicated at 7. A transmitter 8 is also shown on the top of the airplane and can be used for an air-to-air identification system. Only the ground-to-air embodiment will be discussed, but it is obvious that an air-to-air embodiment may be readily built by using the concepts disclosed in this application.

The signal detected by the receiver 4 is converted into an audio signal which is relayed to the ground observer through the hearing device 10. If there is no signal from the aircraft, the ground observer assumes the aircraft is a stranger. If a signal is present, the possibility still exists that other aircraft may be transmitting infrared signals which can give a false identification to the ground observer. To prevent this, the signal is coded and the code is changed periodically such as once a day. This invention also provides a means of coding an infrared signal which can be readily changed on a daily basis.

Figures 4, 6:
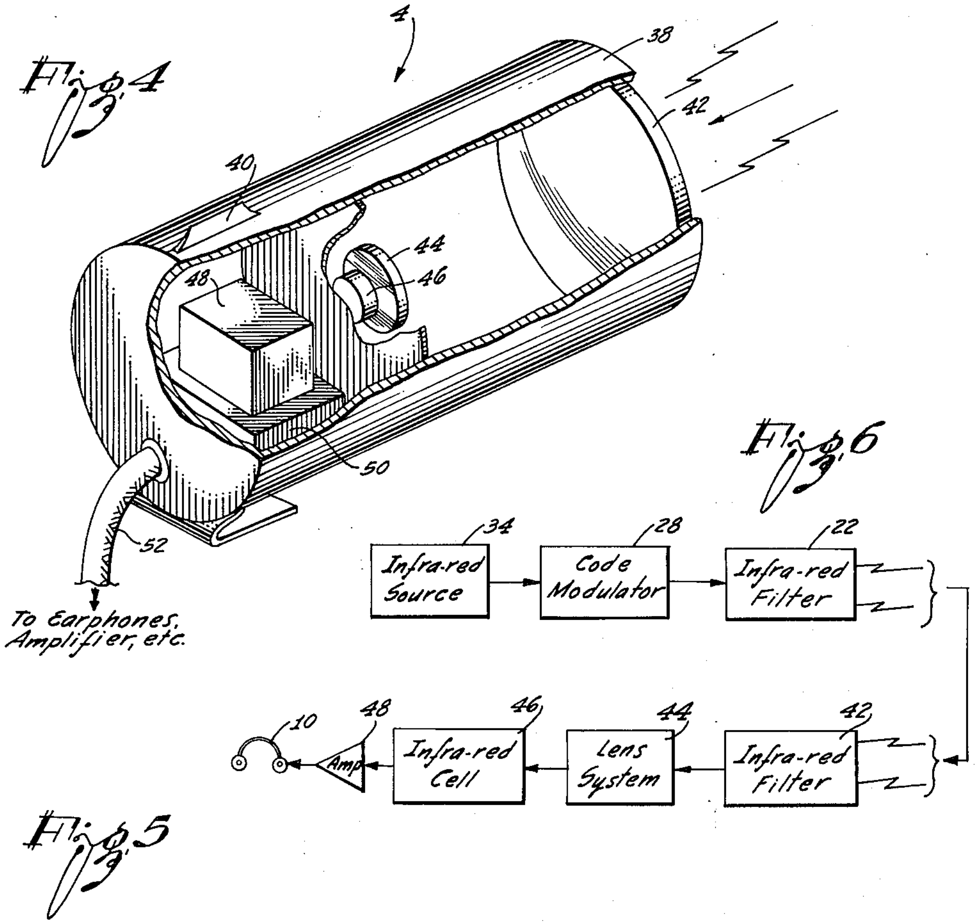
FIGURE 4 shows a detailed view of the receiver held by the ground observer.
FIGURE 6 is a block diagram of the complete electrical system including the transmitter in the aircraft and the receiver held by the ground observer.

FIGURE 2 is a detailed view of one embodiment of the transmitter 6 that is mounted on the aircraft, and FIGURE 6 schematically illustrates the interrelationship of various stages in the transmitter. The underside of the airplane is indicated generally at 12. A casing 14 has contained therein a motor 16 with a drive shaft 18. The casing 14 is mounted to the underside of the aircraft 12 by the use of a flange 20. An optical dome 22 is mounted by a quick-release clamp 24 to the casing 14 so as to hang below the aircraft. A drain hole plug 25 is located at the bottom of the optical dome 22.

Within the optical dome 22 is a translucent mandrel 26 on which is mounted a code word band 28. The mandrel 26 is mounted on a large gear 30 and is driven by the motor 16 through a gear train including gears 31, 32 and 33, the gear 33 being formed at one end of the shaft 18. Inside the mandrel 26 and the optical dome 22 is a source of energy 34. The source 34 may be a DC tungsten light bulb and is used to radiate light in the visible and infrared spectrum. The bulb may have a suitable input power such as input power of approximately 150 to 300 watts. Power for the motor 16 and source 34 is obtained from the aircraft through a power line 36 and a plug 35. The energy from the bulb passes through the mandrel 26 since it is made of a translucent material such as a plastic made from a polymerized methyl methacrylate resin and designated by the trademark "Lucite." Since the code word band 28 is mounted on the mandrel 26, it rotates with the mandrel to modulate in amplitude the steady signal from the light bulb in accordance with the information on the band.

The mandrel 26 supports the code word band 28 in a manner to allow quick changes of the code word band in order to change the code periodically such as on a daily basis. By way of illustration, the code word band 28 may be made of a thin strip of metal, plastic or photographic film. When the band 28 is made from a metal, the amplitude modulation of the light source 34 may be accomplished by slitting the metallic band to provide translucent and opaque portions in a pattern representing the code word at progressive annular positions along the band. When the band 28 is made from a plastic material, the amplitude modulations may be produced by etching portions of the material to produce opaque portions on a translucent background in a pattern in the annular direction corresponding to the desired code word.

As the code word band 28 rotates about the light source 34, the energy transmitted to any particular position removed from the transmitter is low or high at each instant depending upon whether a translucent or opaque portion on the band 28 is aligned with the particular position and the light source 34 at that instant. This provides an on-off type of amplitude modulation at the particular position at successive instants of time in a pattern corresponding to the pattern of information annularly disposed around the periphery of the band 28.

The type of code employed preferably represents an actual spoken word or phrase. Other types of codes may be used but a spoken word or phrase offers the best compromise. One reason is that a spoken word is readily understood by the average ground observer. Another reason is that different words are easily distinguished from each other.

Since the frequency content of speech is highly redundant, the on-off type of modulation which retains only the points where the voice modulation crosses the zero axis provides almost complete intelligibility. This can be seen with reference to the waveforms illustrated in FIGURE 3.

FIGURE 3(*a*) shows the frequency content of a broad "*a*" which has been clipped to eliminate most of the peaks on the waveform. FIGURE 3(*b*) shows a square wave approximation of FIGURE 3(*a*) which preserves the points where the signal goes from a positive to a negative value. Many small high-frequency variations are lost by this method, but these variations would not be preserved in the restrictive bandwidth receiver used in the system.

If the bandwidth for the receiver is chosen to fall between a restricted range, the waveform of FIGURE 3(*c*) is reproduced as an information signal. This signal represents the code word with intelligibility and with almost complete characteristics individual to the particular speaker. Also, the code word is repetitive since the code word band rotates continuously, and the ground observer has an opportunity to listen to the code word many times if initial difficulty is encountered in understanding the code word.

The bandwidth of the coded word is chosen to optimize conditions which occur within the system and are present in the human voice. The principal intelligence content of the human voice is above 200 to 500 cycles per second. Because of this, the minimum frequency of the bandwidth representing the modulations may be between 200 to 500 cycles per second. On this basis, a minimum frequency of 500 cycles per second may be chosen for the lower frequency limit. This frequency is within the capabilities of a lead sulphide cell, which may be used as the detecting stage 46 in the receiver. This results from the fact that the cell exhibits noise characteristics of $1/f$, where $f$ is the frequency of the modulations.

The upper frequency limit of the bandwidth is dependent upon the time constant of the cell since frequencies above 2,000 to 3,000 cycles per second would suffer some attenuation. Also, the mechanical considerations of the size of the slits in the metallic code word band 28 dictate that, for a code word band having a radius of 6 inches with a slit size of 10 mils, the upper frequency should be about 2,000 cycles per second. The final bandwidth chosen may be between 500 to 2,000 cycles per second to meet all of the above considerations.

The code word band 28 is rotated by the motor 16 through the gear arrangement at approximately 2 revolutions per second. As the light signal passes through the mandrel 26 and the code word band 28, it is modulated in accordance with the pattern of slits on the metallic code word band 28. This modulated signal contains both visible and infrared energy. Since it is desired to use only the infrared portion of the energy radiating from the light bulb 34, the optical dome 22 acts as a filter to allow only the infrared portion of the energy to pass to the atmosphere. The optical dome may be formed of treated trifluorochlorethylene plastic such as "Kel-F" or red tinted glass such as Corning 255.

FIGURE 4 shows a detailed view of the receiver 4 illustrated in FIGURE 1 and FIGURE 6 schematically illustrates the interrelationship of the various stages in the receiver. The receiver has an outer casing 38 with a sight 40 mounted thereon. The sight 40 is used by the ground observer to visually aim the receiver 4 at the airplane to identify the airplane. The signals radiated from the transmitter 6 on the airplane are collected by a lens 42 located at the front of the receiver. The lens 42 may have a 3-inch diameter with a field of view of approximately 5 degrees. A smaller lens can be used if the output power from the transmitter 6 is increased. The collector lens 42 may be made of a red tinted glass to act as a filter and allow only infrared energy to pass into the receiver. Alternatively, a separate filter may be mounted in front of or behind the collector lens 42.

The infrared energy passes to a condenser lens 44 to focus the infrared energy on an infrared cell 46. The cell 46 may be of the uncooled lead sulphide type. The cell 46 produces a square wave output from the detected infrared signal, with the frequency of the square wave output being dependent upon the size and spacing of the slits in the metallic code word band 28.

The square wave signal from the infrared cell 46 is applied to a transistor amplifier 48. Batteries 50 are mounted within the receiver 4 to serve as a source of supply for the transistor amplifier 48. The amplifier 48 directly produces an audio signal since the amplifier is designed to have a bandpass of 500 to 2,000 cycles per second, which automatically demodulates the signal supplied by the cell 46. The audio signal passes through a cable 52 to the earphones 10 for audible detection by the ground observer. If it is desired, the audio signal can be reproduced by a loudspeaker or further amplification can be provided before the audio signal is reproduced.

Figure 5:
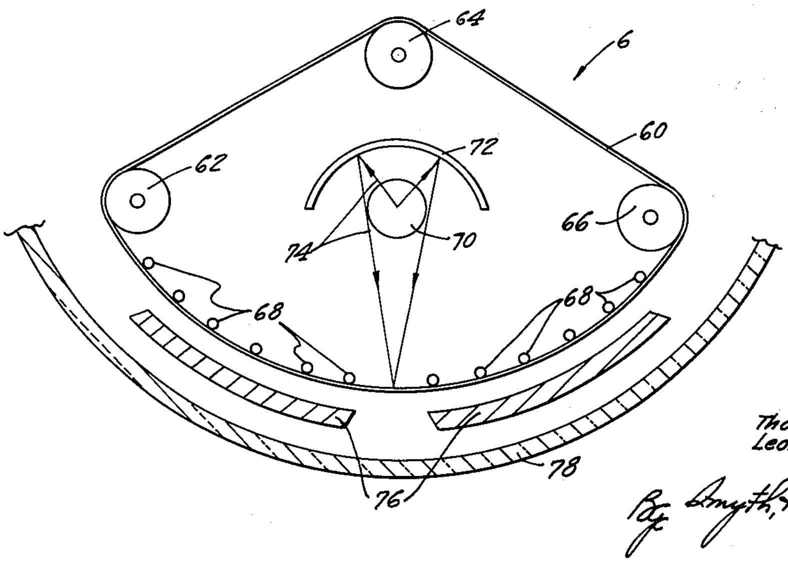
FIGURE 5 shows a schematic view of another embodiment of a transmitter located on the aircraft.

Another embodiment of the transmitter 6 is shown in FIGURE 5. A belt arrangement is used and the light is projected through the belt in the same manner as with a motion picture projector. This removes most of the belt from the light, to prevent overheating, and only one slit at a time is illuminated.

A belt 60 is supported by rollers 62, 64 and 66 and by cage members 68. One of the rollers may be driven by a constant speed motor to rotate the belt 60, or a separate driving means may be used. The belt 60 is similar to the code word band 28 illustrated in FIGURE 2 in that the belt is slit to either pass or block energy to produce a code word. An alternate form of the belt 60 would be a translucent plastic which is photo-etched to produce opaque areas.

A light source 70, which may be a D.C. tungsten light bulb, is mounted inside the rotating belt 60. A reflector 72 is placed to imgae the light bulb 70 at the plane of the belt 60. This is shown by arrows 74. A baffle 76 is provided in front of the belt 60 to control the area that the transmitted signal covers. An optical dome 78 is used to pass only the infrared energy. The dome 78 may be formed from treated plastic or red tinted glass in the same manner as the dome 22 in FIGURE 2.

The transmitter of FIGURE 5 is not omnidirectional but the coverage is designed to include the entire frontal and side areas of the aircraft with the rear area eliminated to save power in the light source 70. Since the light source 70 is more efficiently used in FIGURE 5 as opposed to FIGURE 2, the wattage size of the light source can be reduced with no loss of transmission distance.

The foregoing system illustrates how a ground observer carrying a receiver unit can identify low-flying aircraft. If the aircraft is a friend, it transmits a signal which is received by the ground observer and the signal has characteristics to identify the aircraft to the ground observer.

The word code can be changed periodically, such as daily, to ensure a positive identification of the aircraft since other aircraft having similar transmitting units may be sending out similar signals. The signal is produced by either a revolving drum or rotating belt, which can be mass produced to facilitate the periodic changes. As a further means of ensuring positive identification, both the drum and the belt are mechanically difficult to duplicate since an accurate determination of the size and distance of the opaque and translucent areas are necessary.

The transmitter on the aircraft may also be used as a means to disseminate a code word for the day, to ground observers who are scattered over a large terrain. The aircraft would be a type that is readily identifiable as a friend, and as it broadcasts the code word, the ground observer, hearing this, can determine that other planes that fly on that day and use the same code are friendly.

The principles outlined in this application are merely illustrative of the invention and it will be readily apparent to those skilled in the art that other embodiments may be used. For example, the aircraft may contain the receiver and the ground observer may have the transmitter. By the use of various code words to represent different areas, the pilot of the aircraft can determine his location.

Also, the invention may be used to identify ground or sea vehicles since the transmitter can be mounted in a wide variety of places. The application is therefore to be limited only by the following claims.

What is claimed is:

1. An identification system using a code message in the audio frequency range, including,
- means for producing energy in an infrared band,
- means operatively coupled to the energy means and having first areas for passing the energy and having second areas for inhibiting the passage of the energy and with the first and second areas alternately disposed in a particular pattern in representation of the wave pattern of the code message in the audio frequency range for repetitive modulation of the energy in the infrared band,
- means operatively coupled to the modulator means to transmit the modulated energy,
- means for receiving the modulated energy,
- and means responsive to the received energy for demodulating the energy to detect the code message.

2. An identification system using modulated infrared energy representing a spoken word, including,
- an infrared tranmitter, including,
  - source means for producing infrared energy,
  - means operatively coupled to the source means and having first and second alternate areas disposed in a particular patten in representation of the wave pattern of the spoken word and with the first area transparent to the infrared energy and with the second area opaque to the infrared energy for repetitive modulation of the infrared energy,
  - and means responsive to the infrared energy to transmit the modulated infrared energy omnidirectionally; and
- a receiver, including
  - means responsive to the modulated infrared energy to receive and focus the infrared energy,
  - means responsive to the focused infrared energy to detect the modulations in the infrared energy and convert such modulations to an electrical signal,
  - and means responsive to the electrical signal to produce from the electrical signal an audio sound repetitively representing the spoken word.

3. An infrared identification system using a code message in the audio frequency range for use between two objects having relative motion, including,
- source means of light in the visible and infrared spectrums, the source means being mounted on one of the objects,
- means operatively coupled to the source means and having first areas transparent to the light in the visible and infrared spectrums and having second areas opaque to the light in the visible and infrared spectrums and with the first and second areas alternatively disposed in representation of the wave pattern of the code message in the audio frequency range for repetitive modulation of the light in the visible and infrared spectrums,
- means operatively coupled to the modulation means for passing only the modluated light in the infrared spectrum,
- means at the other object and responsive to the modulated light in the infrared spectrum to detect the modulated light for the production of an electrical signal repetitively representing the code message,
- and means responsive to the electrical signal for producing sounds representing the code message to provide a determination as to the identification of the one object.

4. The system set forth in claim 3 wherein the modulating means includes a member enveloping the light source and movable in a closed loop and having translucent and opaque portions to modulate the light from the source for the production of light having a variable characteristic of zero intensity at the opaque portions of the member and a particular intensity different from zero at the translucent portions of the member.

5. The system as in claim 4 wherein the means passing the modulated light in the infrared spectrum includes an optical dome surrounding the modulation means and having color characteristics to pass light only in the infrared spectrum and to absorb the light in the visible spectrum.

6. A system for identifying a vehicle using a code message in the audio frequency range, including,
- a source of infrared energy and mounted on the vehicle,
- modulating means operatively coupled to the source and enclosing the source and having a member movable in a closed loop and provided with translucent and opaque portions in a pattern representing the code message in the audio frequency range to provide a coded infrared signal at a particular position removed from the modulating means in accordance with the pattern of the translucent and opaque portions,
- driving means operatively coupled to the modulating means for obtaining a movement of the modulating means in a closed loop,
- and means at the particular position and responsive to the coded infrared signal to detect the infrared signal and produce an electrical signal having characteristics in accordance with the pattern of the translucent and opaque portions in the modulating means for use in identification of the vehicle.

7. The system as in claim 6 wherein the modulating means includes a translucent cylindrical mandrel concentric with the infrared source means and also includes a band of material mounted on the mandrel and provided with the opaque and translucent portions and wherein the mandrel and the band of material are rotated by the driving means.

8. The system as in claim 6 wherein the modulating means includes an endless belt and guide rollers and wherein the endless belt is mounted on the guide rollers for movement.

9. The system as in claim 6 wherein the modulating means includes a member disposed in a closed loop and made from a metal with the translucent portions formed by slots in the metal and the opaque portions formed by the metal itself.

10. The system as in claim 6 wherein the modulating means includes a member disposed in a closed loop and made from a translucent plastic material with the opaque portions formed by etched portions of the plastic material and the translucent portions formed by the plastic material itself.

11. An identification system using a code message in the audio frequency range, including, means for producing energy in an infrared band, means operatively coupled to the energy means and having first areas for passing the energy and having second areas for inhibiting the passage of the energy and with the first and second areas alternately disposed in a particular pattern in representation of the wave pattern of the code message in the audio frequency range for repetitive modulation of the energy in the infrared band to produce a square wave approximation of an energy representation of the code message in the audio frequency range with the square wave approximation having two intensity levels with a change from one level to the other corresponding to a point where the energy representation of the code message goes from a first polarity to a reverse polarity, means operatively coupled to the modulator means to transmit the modulated energy, means for receiving the modulated energy, and demodulating means responsive to the received energy to produce an approximation of the code message from the received energy.

12. A transmitter for an identification system for producing a code message in the audio frequency range, including, a source of light in a broad spectrum including an infrared band of energy, means operatively coupled to the source of light and having first areas for passing the energy and having second areas for inhibiting the passage of the energy and with the first and second areas alternately disposed in a particular pattern in representation of the wave pattern of the code message in the audio frequency range for repetitive modulation of the energy in the infrared band to produce a square wave approximation of an energy representation of the code message in the audio frequency range with the square wave approximation having two intensity levels with a change from one level to the other corresponding to a point where the energy representation of the code message goes from a first polarity to a reverse polarity, and means operatively coupled to the modulating means for passing only the modulated energy in the infrared band of frequencies.

13. A transmitter for an identification system for producing a code message in the audio frequency range, including, a source of light in a broad spectrum including an infrared band of energy, a member operatively coupled to the source of light and disposed in a closed loop and movable in the direction of the loop and including alternative translucent and opaque portions disposed in a particular pattern in representation of the wave pattern of the code message in the direction of movement to modulate the light from the source for the production of a signal representing a code message in the audio frequency range, means operatively coupled to the member for obtaining a movement of the member in the direction of the loop, and a radome operatively coupled to the cylindrical member to pass only the modulated energy in the infrared band of frequencies.

14. A method of identifying a moving object using a coded message in the audio frequency range including the steps of, producing at the object a broad spectrum light signal including the infrared band, repetitively modulating the light signal in representation of the wave pattern of the coded message to produce a light signal representing the coded message in the audio frequency range in each repetitive modulation, transmitting only the portion of the coded light signal in the infrared band from the target, receiving at a distant receiver the portion of the coded light signal in the infrared band, detecting the portion of the coded light signal in the infrared band to produce an electrical signal representing the coded message, and converting the electrical signal into an audio message to obtain an identification of the object.

15. A method of identification using a coded message in the audio frequency range, including the steps of, producing a light signal including a band of infrared energy, repetitive modulating the band of infrared energy in representation of the wave pattern of the coded message to produce an output signal representing the coded message in the audio frequency range, transmitting the coded band of infrared energy, receiving the coded band of infrared energy, detecting the coded band of infrared energy to produce an electrical signal representig the coded message, demodulating the coded electrical signal to produce an information signal representing the coded message, and converting the information signal to an audio message to obtain a determination of the identity of the source of the band of infrared energy.

References Cited by the Examiner

UNITED STATES PATENTS

| | | | |
|---|---|---|---|
| 1,466,701 | 9/1923 | De Forest | 250—199 |
| 1,642,011 | 9/1927 | Chubb | 250—199 |
| 1,818,018 | 8/1931 | Stocker | 250—233 |
| 1,976,120 | 10/1934 | Francis | 250—199 |
| 2,939,938 | 6/1960 | Ravich | 219—20 |
| 2,943,201 | 6/1960 | Hicks et al. | 250—83.3 |
| 2,999,163 | 9/1961 | Beese | 250—86 |

FOREIGN PATENTS

| | | |
|---|---|---|
| 798,538 | 7/1958 | Great Britain. |
| 800,190 | 8/1958 | Great Britain. |

OTHER REFERENCES

Huxford et al.: Journal Opti. Soc. Amer., vol. 38, No. 3, March 1948, p. 253–268.

DAVID G. REDINBAUGH, *Primary Examiner.*

MAYNARD R. WILBUR, *Examiner.*